(12) United States Patent
Lommen

(10) Patent No.: US 7,411,548 B2
(45) Date of Patent: Aug. 12, 2008

(54) REFERENCE BEACON IDENTIFICATION USING TRANSMISSION SEQUENCE CHARACTERISTICS

(75) Inventor: Layne D. Lommen, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/279,419

(22) Filed: Apr. 12, 2006

(65) Prior Publication Data

US 2007/0257832 A1 Nov. 8, 2007

(51) Int. Cl.
*G01S 1/08* (2006.01)
*G01S 1/24* (2006.01)
*G01S 1/44* (2006.01)
*G01S 3/02* (2006.01)
*G01S 7/40* (2006.01)

(52) U.S. Cl. .................. 342/386; 342/387; 342/398; 342/463; 342/465; 342/174

(58) Field of Classification Search .......... 342/174, 342/386–387, 398, 463–465; 375/272–278, 375/303–307, 334–337
See application file for complete search history.

(56) References Cited

U.S. PATENT DOCUMENTS

| | | | | |
|---|---|---|---|---|
| 3,644,883 | A * | 2/1972 | Borman et al. ............ | 342/57 |
| 3,944,967 | A * | 3/1976 | Acks et al. ............... | 367/117 |
| 4,543,657 | A * | 9/1985 | Wilkinson ................ | 375/367 |
| 4,740,792 | A * | 4/1988 | Sagey et al. .............. | 342/457 |
| 5,008,679 | A * | 4/1991 | Effland et al. ............ | 342/465 |
| 5,039,951 | A * | 8/1991 | Cheung et al. ............ | 375/334 |
| 5,874,916 | A * | 2/1999 | Desjardins ............... | 342/378 |
| 5,945,947 | A * | 8/1999 | Cunningham ............ | 342/398 |
| 5,969,260 | A * | 10/1999 | Belk et al. ................ | 73/773 |
| 5,999,116 | A * | 12/1999 | Evers ..................... | 342/463 |
| 6,061,388 | A * | 5/2000 | Saulnier et al. ........... | 375/130 |
| 6,498,934 | B1* | 12/2002 | Muller .................... | 455/450 |
| 7,253,717 | B2* | 8/2007 | Armstrong et al. ........ | 340/10.2 |
| 2002/0030874 | A1* | 3/2002 | Heidemann et al. ....... | 359/152 |
| 2002/0063622 | A1* | 5/2002 | Armstrong et al. ....... | 340/10.31 |
| 2003/0017832 | A1* | 1/2003 | Anderson et al. ......... | 342/357.11 |
| 2003/0052821 | A1* | 3/2003 | Holt ....................... | 342/465 |
| 2004/0016812 | A1* | 1/2004 | Schmidt et al. ........... | 235/462.31 |
| 2006/0003739 | A1* | 1/2006 | Sasakura et al. .......... | 455/411 |

OTHER PUBLICATIONS

Federal Standard 1037C, Aug. 1996.*

\* cited by examiner

*Primary Examiner*—Thomas H. Tarcza
*Assistant Examiner*—Fred H. Mull
(74) *Attorney, Agent, or Firm*—Brosemer, Kolefas & Assoc., LLC

(57) ABSTRACT

A method and apparatus for encoding information in a reference beacon signal for use in a time-difference-of-arrival/frequency-difference-of-arrival (TDOA/FDOA) geolocation system. Information is encoded in the reference beacon signal using variations in the times and frequencies of sequential reference signal transmissions. The encoded information may include an identifier associated with the transmitter of the reference beacon signal. A geolocation system receiving the reference beacon signal can thus differentiate it from non-cooperative target emissions as well as from other reference beacon signals.

20 Claims, 3 Drawing Sheets

REFERENCE BEACON IDENTIFICATION USING TRANSMISSION SEQUENCE CHARACTERISTICS

FIELD OF THE INVENTION

The present invention relates generally to identification of transmissions using transmission sequence characteristics, and more specifically to the identification of reference beacons used in time-difference-of-arrival (TDOA) and frequency-difference-of-arrival (FDOA) measurement techniques and systems.

BACKGROUND INFORMATION

Errors in time-difference-of-arrival (TDOA) and frequency-difference-of-arrival (FDOA) measurements used to perform geolocation of non-cooperative emitters (i.e., signals of unknown format or content, transmitted from an unknown location) can be reduced by use of a reference beacon that transmits a signal from a known position. By performing a reverse geolocation using signals transmitted from a reference beacon having a known position and velocity, it is possible to estimate bias errors in the TDOA/FDOA measurements taken by the geolocation system. The estimated bias errors can then be subtracted from measurements taken of non-cooperative emitter signals to reduce the bias error in those measurements. Such correction is typically performed by a reference correction processor that is part of or operates in conjunction with the geolocation system.

Typically, TDOA/FDOA collection receivers do not, or cannot, differentiate between signals received from a non-cooperative (or target) emitter and signals received from a reference beacon. It is up to the geolocation or reference correction processor to differentiate between the two types of signals and to process each type appropriately.

In addition to identifying whether a received signal is associated with a target emitter or a reference beacon, the reference correction processor may also need to associate a given reference correction signal with the individual reference beacon that transmitted it, so that its location can be determined.

TDOA/FDOA geolocation systems currently deployed by the U.S. Government differentiate between target emitters and reference beacons and identify the source of a particular reference signal by the fact that the geolocation (or reference correction) processor directly controls the times and frequencies of the reference beacon transmissions. The geolocation processor knows a priori when in time and at which frequency transmissions from a particular reference beacon will arrive at the collectors associated with the system. This precludes the possibility of a reference beacon randomly initiating reference signal transmissions without coordination with the geolocation processor.

In order to control the transmissions of a reference beacon from a geolocation processor, a communications link is required between the two. Such a link is typically provided by a data communications network. Even with such an arrangement, however, the determination that a signal received by a geolocation system is that of a specific reference beacon, or of a reference beacon at all, is not entirely unambiguous.

SUMMARY OF THE INVENTION

An embodiment of the present invention is directed to a method and apparatus of identifying a signal received by a geolocation system as a reference beacon transmission, as well as identifying the specific source of a reference signal transmission, using variations in the times and frequencies of sequential reference signal transmissions. The present invention allows a geolocation or reference correction processor to differentiate between signals transmitted by non-cooperative (target) emitters and signals transmitted by reference beacons. The present invention also enables differentiation among signals transmitted by different reference beacons.

Advantageously, the method of the present invention can be carried out without requiring demodulation of the received signal. The present invention also has the benefit that, under most circumstances, it is unlikely that a reference beacon signal will be detected, but not be identifiable.

The aforementioned and additional features and advantages of the present invention are further described below.

DETAILED DESCRIPTION

Figure 1:
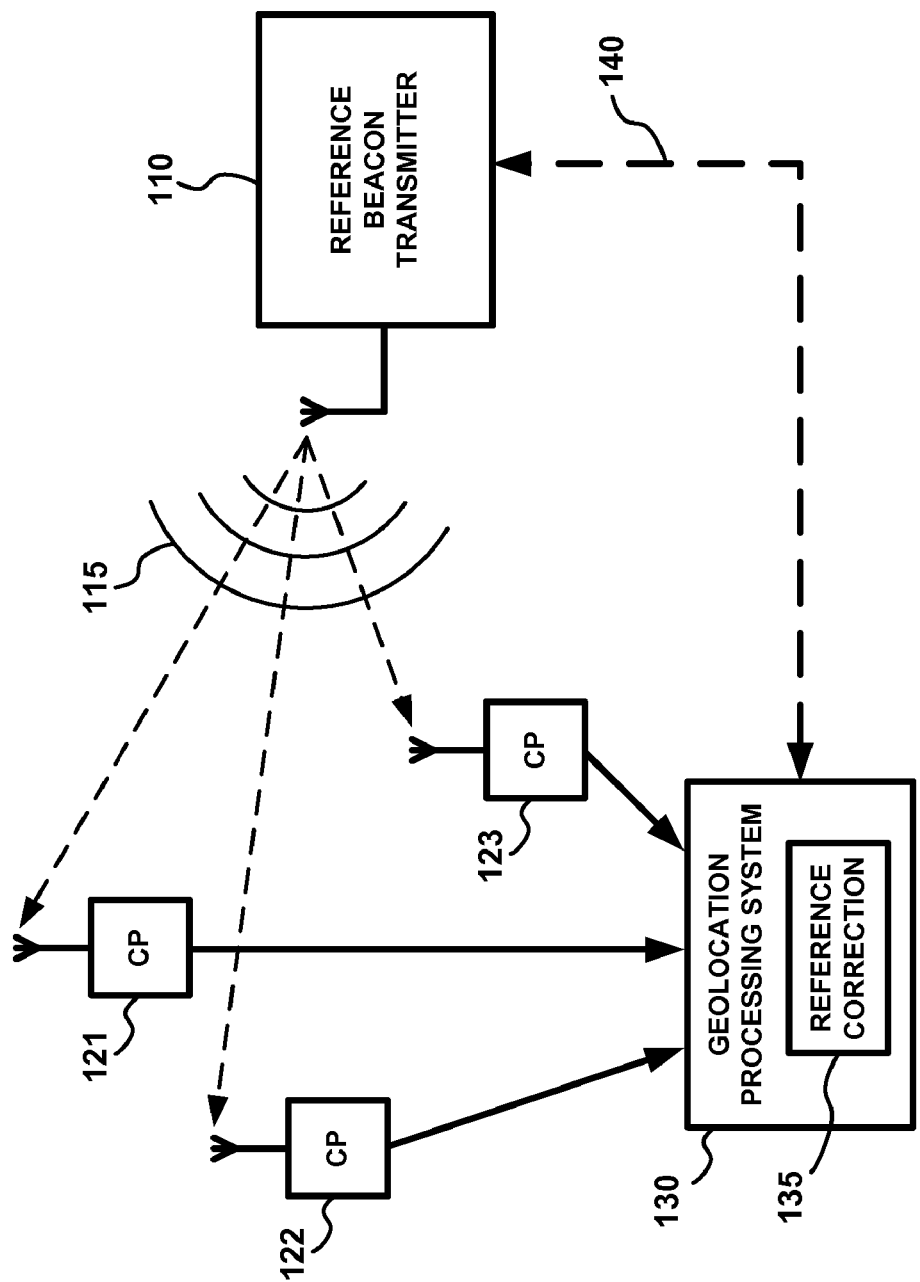
FIG. 1 is a block diagram of an exemplary embodiment of a geolocation system with a reference beacon transmitter, in accordance with the present invention.

FIG. 1 shows a block diagram of an exemplary embodiment of a TDOA/FDOA geolocation system, in accordance with the present invention. The arrangement of FIG. 1 includes a reference beacon transmitter 110 which transmits a reference beacon signal 115. The reference beacon signal 115 may comprise any signals appropriate for reference beacons, including non-information-bearing signals, such as pseudo-random waveforms, and information-bearing signals as described in co-pending U.S. patent application Ser. No. 11/279,012, filed on Apr. 7, 2006, and incorporated herein by reference in its entirety.

The position and/or velocity of the reference beacon transmitter 110 can vary with time (e.g., the transmitter 110 is carried in a moving aircraft), or the transmitter 110 can be stationary.

The reference beacon signal 115 is received by one or more collection platforms 121-123 which are in communication with and operate in conjunction with a geolocation processing system 130. The geolocation processing system 130 includes a reference correction processing sub-system or function 135 (also referred to as reference correction processor 135). The reference correction processor 135 may be implemented as part of the geolocation processing system 130 or as a separate element.

In conjunction with the collection platforms 121-123, the geolocation processing system 130 operates in accordance with conventional TDOA/FDOA techniques to estimate the location and/or velocity of various emitters, including non-cooperative emitters as well as reference beacons. The reference correction processor 135 uses information relating to the position and/or motion of the reference beacon transmitter 110 to estimate TDOA/FDOA bias errors that can be used to improve the geolocation processing system's 130 estimates of emitter location and/or velocity.

The position and/or motion information of the reference beacon 110 can be provided to the reference correction processor 135 by any suitable means, including, for example, a communications link 140, via the reference beacon signal 115

(as described in the aforementioned U.S. patent application Ser. No. 11/279,012), or, in the case of stationary reference beacons, by providing the information in a storage means (e.g., database) accessible to the reference correction processor 135.

In accordance with an aspect of the present invention, a scheme is provided for embedding information into a reference beacon signal. Such information may include, for example, the identity of the reference beacon transmitter 110 transmitting the reference beacon signal 115. This enables a geolocation system that receives such a signal to distinguish it from other signals, including other reference beacon signals.

In accordance with an exemplary embodiment of the present invention, each reference beacon transmitter 110 that is to be separately identified is assigned a unique identifier, e.g., an identification number. A reference beacon transmitter's identifier is encoded into a sequence of signal segments transmitted by that transmitter. Such a sequence is also referred to herein as an ID message.

In an exemplary embodiment of the present invention, the transmitter 110 transmits a sequence of reference beacon signal segments at varying, but non-random relative start times and/or frequencies. The values of the non-random relative start times and frequencies are used to encode the sequence of bits which make up the reference beacon ID.

The TDOA/FDOA collection platforms 121-123 capture the waveform segments independently, and record, for each segment, its time of arrival (TOA), and frequency of arrival (FOA), which is typically the center frequency of the received signal segment.

The reference correction processor 135 checks the TOAs and FOAs of multiple signal segments and determines whether they are reference beacon signals based on whether the TOA and FOA values meet predetermined criteria. In addition to determining whether the signal segments are from a reference beacon, the reference correction processor 135 can also decode the ID of the reference beacon from the TOA and FOA values.

In an exemplary embodiment, a reference beacon transmitter 110 operating in accordance with the present invention transmits a first reference beacon signal segment at a first time and frequency. The transmitter 110 then transmits a second reference beacon signal segment at a second start time and frequency. The transmitter 110 may continue to transmit additional signal segments at various start times and at various frequencies until a desired number of signal segments have been transmitted.

Preferably, the relative start times and frequency shifts between sequential reference signal transmissions have values that are very unlikely to occur randomly, or be observed in transmissions of non-cooperative (target) emitters. Such a requirement allows a receiving geolocation system to differentiate a reference beacon signal from a signal emitted by a target emitter.

Figure 2:
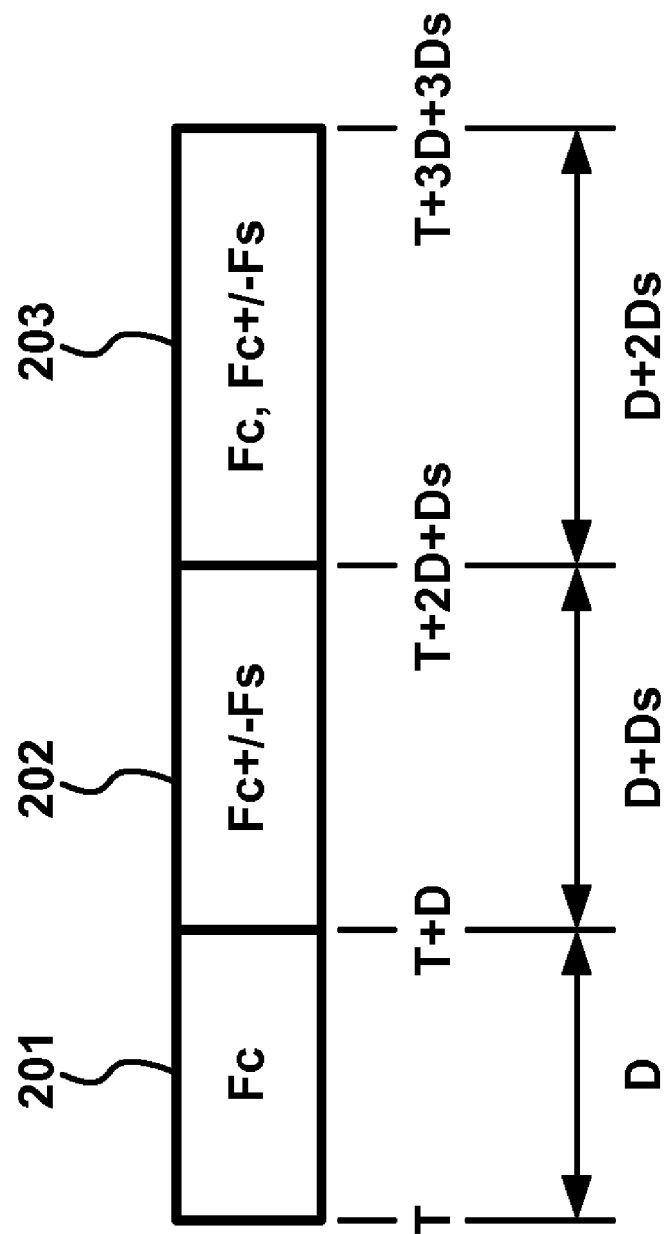
FIG. 2 illustrates an exemplary sequential arrangement of signal segments in accordance with an encoding scheme of the present invention.

As illustrated in FIG. 2, in an exemplary embodiment of the present invention, a first signal segment 201 is transmitted at frequency Fc, at start time T. A second signal segment 202 is transmitted at one of two other frequencies, Fc+Fs or Fc−Fs, at start time T+D. A third signal segment 203 is transmitted at one of three frequencies Fc, Fc+Fs, or Fc−Fs, at start time T+2D+Ds. In this embodiment, Fc is an arbitrary transmission frequency; Fs is a frequency shift; D is the time interval between the start times of the first two signal segments 201 and 202; and Ds is an incremental time interval that is a fraction of the value of D (e.g. 10%). The frequency shift Fs should be sufficiently large so that a receiving geolocation system will be able to discriminate between adjacent signal segments and recognize them as separate signal segments.

The relative start time of each signal segment is preferably unique. In an exemplary embodiment, where n is the sequential position of a segment with n=0 for the first segment:

$D(n)=D+nD_s,$ $T(0)=T,$ and $T(n)=T(n-1)+D(n-1),$ for n>0, where $D(n)$ is the time interval between the start times of segment n and segment n+1, and $T(n)$ is the start time of segment n.

The probability of several random or non-cooperative signals matching the non-random sequence of transmission start times and frequencies of multiple segments of a reference beacon signal transmission can be made arbitrarily small by increasing the number of signal segments in the reference beacon signal transmission. Three or four segments should be sufficient to ensure a sufficiently low probability of false detection for most cases.

In an exemplary embodiment, the identifier associated with a specific reference beacon is encoded into the sequence of signal segments by the choice of frequencies at which the segments are transmitted. Preferably, each bit of the reference beacon identifier is encoded in the frequency shift between adjacent signal segments. For example, a frequency shift of +100 kHz or −200 kHz indicates a "1" bit, while a shift of −100 kHz or +200 kHz indicates a "0" bit. Under this exemplary encoding scheme, the number of possible transmission frequencies is limited to three.

Differential frequency values, rather than the absolute frequency values themselves are preferably used in order to prevent the possibility of adjacent sequences transmitting at the same frequency. Moreover, under such a scheme, the absolute frequency values at which the reference beacons are transmitted need not be known by the receiving geolocation system.

The rate at which the ID bits can be encoded into the reference beacon signal is limited by the number of transmission frequencies used. The use of three transmission frequencies, for example, limits the rate at which the ID bits can be encoded to one bit per signal segment (or data symbol). For example, to transmit an 8-bit identifier using transmission segments of 100 ms each would require 800 ms, which may be longer than desired for some applications.

If the number of possible transmission frequencies is increased, the rate at which the ID bits can be encoded and transmitted is increased. For example, using five frequencies allows two ID bits to be encoded per signal segment (or symbol); with nine frequencies, three ID bits can be encoded per signal segment/symbol; and so on.

The number of frequencies chosen will be determined by the tradeoff between the minimum transmission duration required to completely transmit an identifier, and the maximum bandwidth range that the transmissions are allowed to span.

Instead of using the frequencies of the signal segments to encode data and the relative start times of the segments to establish their positions (i.e., to perform synchronization) it is possible to use the segment frequencies to perform synchronization and the segment relative start times to encode data. The frequencies of the signal segments are preferably unique and follow a predetermined progression.

A potential problem addressed by an aspect of the present invention occurs when one or more of the transmitted signal segments is not captured by any of the TDOA/FDOA collectors. There are three cases of particular interest: 1) one or more segments in the middle or end of the transmission are missed; 2) one or more segments at the start of a reference transmission are missed; or 3) all segments transmitted at one (or more) frequencies are missed due to RF interference at that frequency (or frequencies).

Because the relative times of arrival and frequencies of arrival of a reference beacon signal transmitted in accordance with the present invention are constrained to a limited set of values, a receiving geolocation system can detect missing signal segments and determine the relative positions of segments in the sequence even if some of the segments are not captured. For example, even if the second segment is not captured, the receiving system can correctly place the third and subsequent segments in their correct sequence positions relative to the first segment and detect that the second segment is missing.

The aforementioned case, in which random segments are missed, can be addressed in more than one way in accordance with the present invention. In a first method, the complete ID message is included multiple times in the reference signal transmission. Doing so will increase the probability that at least one copy of each symbol in the message will be captured. A second method is to add error correction coding to the message, allowing the original message to be recovered by the receiving system even if a small number of random message symbols are missing. The two methods can also be combined. The preferred approach will depend on the specific performance requirements of the system.

Figure 3:
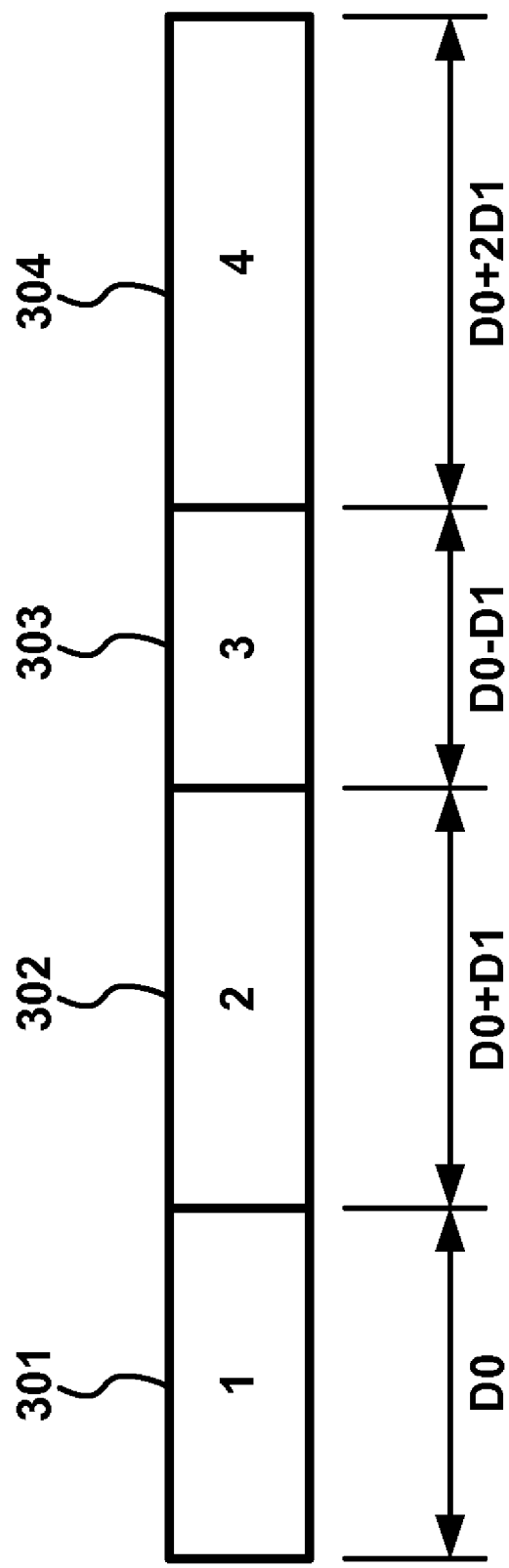
FIG. 3 illustrates a further exemplary sequential arrangement of signal segments in accordance with an encoding scheme of the present invention.

A second case to be addressed arises when the first segment of a sequence is missed by the receiving system. In this case, the receiving system may not know that the first segment captured does not contain the first symbol of the ID message. To address this, synchronization information is encoded into the transmission sequence. This can be accomplished by setting the relative start time of each segment in a sequence to a unique value. For example, as illustrated in FIG. 3, in accordance with an embodiment of the present invention, the time interval between the start of the first segment 301 and the start of the second segment 302 in a transmission sequence has a duration of D0, the time interval between the start of the second segment 302 and the start of the third segment 303 has a duration of D0+D1 (where D1 is relatively small compared to D0, e.g., 10%), the time interval between the start of the third segment 303 and the start of the fourth segment 304 has a duration of D0−D1, and the time interval between the start of the fourth segment 304 and a fifth segment has a duration of D0+2D1. In general, the interval between the start of the Nth segment and the (N+1)th segment has a duration of $D=D0+D1*N/2$ for N=even, and $D=D0−D1*(N+1)/2$ for N=odd.

If the receiving system knows the values of D0 and D1, it can determine the sequence number of each signal segment by checking its start time relative to the start time of the next or previous signal segment. The receiving system may know, a priori, the values of D0 and D1, or it can determine them from the measured start times of the received segments. Given the start times of three sequential signal segments, the receiving system can determine the values of D0, D1 and N, and thus the sequence numbers of all other segments detected at the appropriate relative times and frequencies near the three adjacent segments.

A third case, in which all segments transmitted at a particular frequency are missed, can be addressed in several ways. In a first exemplary method, the reference beacon transmitter transmits the ID message on different sets of frequencies, increasing the probability that at least one transmission sequence will avoid interference. The multiple frequencies should lie within the bandwidths of the collection receivers to ensure that they can be received. The transmissions at the different frequencies can be carried out sequentially or simultaneously.

In a second exemplary method, message symbols can be defined using multiple frequency shifts per symbol such that a missing frequency will still allow the symbol to be uniquely determined. For example, assuming three frequencies are used, F0, F1, and F2, a "0" bit is encoded as two single positive steps from the original frequency, with wrapping from F2 to F0. Thus, depending on the initial frequency, a "0" bit can be represented by one of the following frequency progressions: {F0, F1, F2}, {F1, F2, F0}, or {F2, F0, F1}. Likewise, a "1" bit is encoded as two single negative steps from the original frequency, with wrapping from F0 to F2; i.e., {F2, F1, F0}, {F1, F0, F2}, or {F0, F2, F1}. In this case, each symbol remains detectable even if one of the frequencies is missing. Thus, for example, {F0, XX, F2}, {XX, F1, F2}, and {F0, F1, XX} can all be uniquely resolved to {F0, F1, F2}.

An advantageous aspect of the present invention is that it can be applied to conventional TDOA/FDOA geolocation systems with little modification thereto. Conventional TDOA/FDOA geolocation systems can perform geolocation of target emitters without demodulating the signals received therefrom. Conventional geolocation systems can also perform bias error correction using reference beacon transmissions without demodulating the received reference beacon signals. Conventional TDOA/FDOA systems typically perform geolocation based on the RF frequency of the signals received and on the times of reception. As such, those parameters are already obtained by and available to a conventional TDOA/FDOA geolocation system. The methods of the present invention can be implemented using just those parameters.

It is also relatively straightforward to determine additional parameters of signals received by a geolocation system, including, for example, their duration, bandwidth and amplitude envelope. These parameters can also therefore be used to encode synchronization information and/or data in a reference beacon signal.

It is understood that while the embodiments described above involve the encoding of reference beacon identification information, the present invention is not limited to any particular content or type of content and can be used to encode other types of information as well.

In general, it is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of transmitting transmitter identification information, compnsing:

sequentially transmitting a plurality of signal segments, each signal segment being characterized by a frequency parameter and a time parameter, wherein at least one of the frequency and the time parameters of each signal segment is determined in accordance with the transmitter identification information, wherein a difference in the frequency parameters of adjacent signal segments is indicative of a portion of the transmitter identification information, wherein the time parameter of each signal segment includes a start time of the signal segment, and wherein the start time of a signal segment relative to the other signal segments is indicative of a position of the signal segment within the plurality of signal segments.

2. The method of claim 1, wherein the portion of the transmitter identification information is a bit, the bit having a first binary value if the difference in frequency parameters has a first differential frequency value and the bit having a second binary value if the difference in frequency parameters has a second differential frequency value.

3. The method of claim 1, wherein the start times of the sequentially transmitted signal segments follow a predetermined progression.

4. The method of claim 3, wherein the predetermined progression is in accordance with the following expressions:

$$D=D0+D1*N/2 \text{ for N=even, and}$$

$$D=D0-D1*(N+1)/2 \text{ for N=odd,}$$

where D is the time interval between the start of the Nth and (N+1)th signal segments, and D0 and D1 are predetermined parameters, with $D1=f*D0$, wherein $0<f<1$.

5. The method of claim 1, wherein the portion of the transmitter identification information is a bit, the bit having a first binary value if the frequency parameters follow a first predetermined progression and the bit having second binary value if the frequency parameters follow a second predetermined progression.

6. The method of claim 1, wherein each of the plurality of signal segments includes a pseudo-random waveform.

7. The method of claim 1, comprising:
receiving at least a portion of the plurality of signal segments; and
extracting the transmitter identification information from the received signal segments.

8. A method of transmitting transmitter identification information, comprising:
sequentially transmitting a plurality of signal segments, each signal segment being characterized by a frequency parameter and a time parameter, wherein at least one of the frequency and the time parameters of each signal segment is determined in accordance with the transmitter identification information,
wherein the time parameter of each signal segment is indicative of a portion of the transmitter identification information,
wherein the frequency parameter of each signal segment includes a frequency of the signal segment, and
wherein the frequency of a signal segment is indicative of a position of the signal segment within the plurality of signal segments.

9. The method of claim 8, wherein the portion of the transmitter identification information is a bit, the bit having a first binary value if the time parameter has a first value and the bit having a second binary value if the time parameter has a second value.

10. The method of claim 8, wherein the frequencies of the sequentially transmitted signal segments follow a predetermined progression.

11. An apparatus for transmitting transmitter identification information, comprising:
means for sequentially transmitting a plurality of signal segments, each signal segment being characterized by a frequency parameter and a time parameter, wherein at least one of the frequency and the time parameters of each signal segment is determined in accordance with the transmitter identification information,
wherein a difference in the frequency parameters of adjacent signal segments is indicative of a portion of the reference beacon identifier, wherein the time parameter of each signal segment includes a start time of the signal segment, and
wherein the start time of a signal segment relative to the other signal segments is indicative of a position of the signal segment within the plurality of signal segments.

12. The apparatus of claim 11, wherein the portion of the transmitter identification information is a bit, the bit having a first binary value if the difference in frequency parameters has a first differential frequency value and the bit having a second binary value if the difference in frequency parameters has a second differential frequency value.

13. The apparatus of claim 11, wherein the start times of the sequentially transmitted signal segments follow a predetermined progression.

14. The apparatus of claim 13, wherein the predetermined progression is in accordance with the following expressions:

$$D=D0+D1*N/2 \text{ for N=even, and}$$

$$D=D0-D1*(N+1)/2 \text{ for N=odd,}$$

where D is the time interval between the start of the Nth and (N+1)th signal segments, and D0 and D1 are predetermined parameters, with $D1=f*D0$, wherein $0<f<1$.

15. The apparatus of claim 11, wherein the portion of the transmitter identification information is a bit, the bit having a first binary value if the frequency parameters follow a first predetermined progression and the bit having second binary value if the frequency parameters follow a second predetermined progression.

16. The apparatus of claim 11, wherein each of the plurality of signal segments includes a pseudo-random waveform.

17. The apparatus of claim 11, comprising:
means for receiving at least a portion of the plurality of signal segments; and means for extracting the transmitter identification information from the received signal segments.

18. An apparatus for transmitting transmitter identification information, compnsing:
means for sequentially transmitting a plurality of signal segments, each signal segment being characterized by a frequency parameter and a time parameter, wherein at least one of the frequency and the time parameters of each signal segment is determined in accordance with the transmitter identification information,
wherein the time parameter of each signal segment is indicative of a portion of the transmitter identification information,
wherein the frequency parameter of each signal segment includes a frequency of the signal segment, and
wherein the frequency of a signal segment is indicative of a position of the signal segment within the plurality of signal segments.

19. The apparatus of claim 18, wherein the portion of the transmitter identification information is a bit, the bit having a first binary value if the time parameter has a first value and the bit having a second binary value if the time parameter has a second value.

20. The apparatus of claim 18, wherein the frequencies of the sequentially transmitted signal segments follow a predetermined progression.

* * * * *